(12) United States Patent
Ko et al.

(10) Patent No.: US 7,257,286 B2
(45) Date of Patent: Aug. 14, 2007

(54) DUAL COMB ELECTRODE STRUCTURE WITH SPACING FOR INCREASING A DRIVING ANGLE OF A MICROSCANNER, AND THE MICROSCANNER ADOPTING THE SAME

(75) Inventors: Young-chul Ko, Gyeonggi-do (KR); Jin-woo Cho, Gyeonggi-do (KR); Hyun-ku Jeong, Chungcheongbuk-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/136,392

(22) Filed: May 25, 2005

(65) Prior Publication Data

US 2006/0023994 A1 Feb. 2, 2006

(30) Foreign Application Priority Data

Jul. 28, 2004 (KR) ............... 10-2004-0059114

(51) Int. Cl.
*G02B 6/35* (2006.01)
*G02B 26/10* (2006.01)

(52) U.S. Cl. ............... 385/18; 385/41; 359/225; 359/226; 359/877

(58) Field of Classification Search ........... 385/18–19, 385/41; 359/224–226, 877
See application file for complete search history.

(56) References Cited

U.S. PATENT DOCUMENTS 7,034,370 B2 * 4/2006 Kuo ............... 257/414

\* cited by examiner

*Primary Examiner*—Michelle Connelly-Cushwa
*Assistant Examiner*—Jerry T Rahll
(74) *Attorney, Agent, or Firm*—Buchanan Ingersoll & Rooney PC (57) ABSTRACT

A dual comb electrode structure with spacing for increasing a driving angle of a micro mirror provided by MEMS (Micro-Electro-Mechanical system) structure and a microscanner adopting the same are provided. The dual comb electrode structure includes: a mirror unit for reflecting light; a plurality of movable comb electrodes protruded in both sides of the mirror unit; and a plurality of upper and lower static comb electrodes formed above and below the movable comb electrode so as to be alternated with the plurality of movable comb electrodes formed in both sides of the mirror unit, wherein a spacing between the upper static comb electrode and the movable comb electrode is different from a spacing between the lower static comb electrode and the movable comb electrode.

20 Claims, 7 Drawing Sheets

DUAL COMB ELECTRODE STRUCTURE WITH SPACING FOR INCREASING A DRIVING ANGLE OF A MICROSCANNER, AND THE MICROSCANNER ADOPTING THE SAME

This application claims the priority of Korean Patent Application No. 10-2004-0059114, filed on Jul. 28, 2004, in the Korean Intellectual Property Office, the disclosure of which is incorporated herein in its entirety by reference.

BACKGROUND

1. Field of the Disclosure

An embodiment of the present disclosure relates to a dual comb electrode structure with spacing for increasing a driving angle of a microscanner and the microscanner adopting the same, and more particularly to a dual comb electrode structure with spacing for increasing a driving angle of a micro mirror provided by MEMS (Micro-Electro-Mechanical system) structure and a microscanner adopting the same.

2. Description of the Related Art

Figure 1:
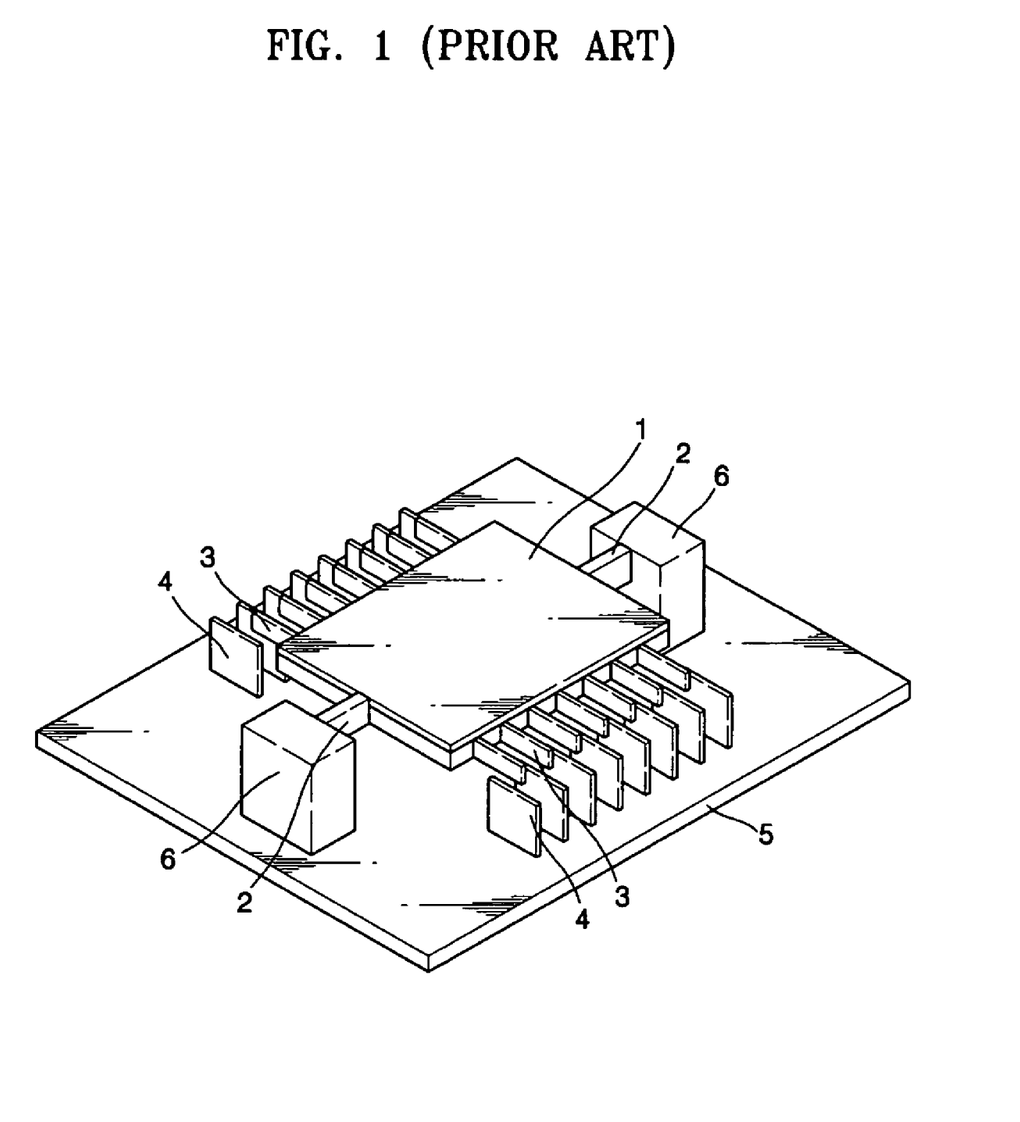
FIG. 1 is a perspective view showing a conventional microscanner.

As a microscanner for deflecting laser beam in a projection TV or the like, a micro actuator with MEMS structure using electrostatic effects by means of comb-type electrode structure is used. FIG. 1 is a perspective view exemplarily showing such a conventional microscanner. As shown in FIG. 1, the conventional microscanner includes, for example, a mirror unit 1 suspended above a substrate 5 made of silicon-on-insulator (SOI) wafer or the like, a support 6 for supporting both ends of the mirror unit 1, a torsion spring 2 connected between the mirror unit 1 and the support 6 to support seesaw movement of the mirror unit 1, a plurality of movable comb electrodes 3 vertically formed in both sides of the mirror unit 1, and a plurality of static comb electrodes 4 vertically formed on the substrate 5 so as to be alternated with the movable comb electrodes 3.

Figure 2A:
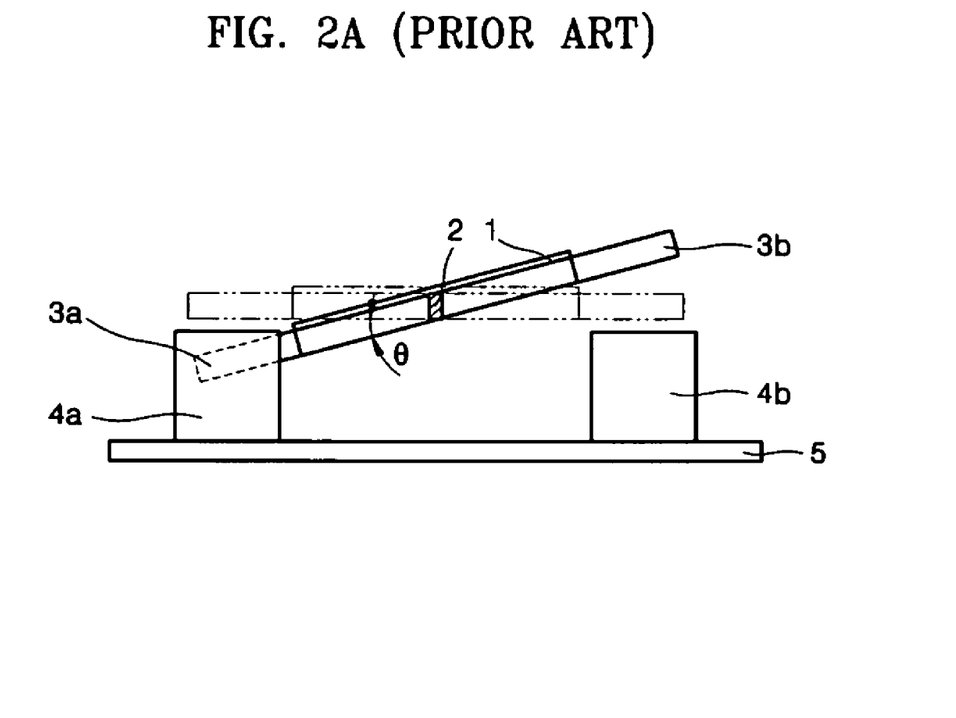
FIG. 2A is a sectional view for illustrating operation of the conventional microscanner.

FIG. 2A is a sectional view for illustrating operation of the conventional microscanner configured as mentioned above. In the microscanner shown in FIG. 1, a predetermined voltage is applied to the movable comb electrodes 3 at both sides of the mirror unit 1, and positive and negative voltages are respectively applied to the static comb electrodes corresponding to the movable comb electrodes 3 at both sides of the mirror unit 1. For example, V voltage is applied to a left static comb electrode 4a, −V voltage is applied to a right static comb electrode 4b, and $V_1$ voltage is applied to both left and right movable comb electrodes 3a and 3b. And then, a voltage difference between the left movable comb electrode 3b and the left static comb electrode 4a (V−$V_1$) is different from a voltage difference between the right movable comb electrode 3b and the right static comb electrode 4b (V+$V_1$), so the mirror unit 1 becomes inclined to one side by an electrostatic force as shown in FIG. 2A. The mirror unit 1 is restored by means of its own restoring force using the modulus of elasticity of the torsion spring 2. Thus, the mirror unit 1 may be periodically moved at predetermined driving angle and driving speed (or, a driving frequency) by suitably adjusting the voltage $V_1$ applied to the movable comb electrodes 3.

Meanwhile, in order to realize an image on a screen by a laser image projection device such as a projection TV, a microscanner should scan laser beams at a very high speed. Since the driving frequency is in inverse proportion to weight, the mirror unit 1 is generally reduced to a size of about 1 mm and a thickness of about 70 μm to decrease the weight. Since the mirror unit 1 has a reduced size as above, a diameter of laser beam reflected by the mirror unit 1 is also reduced. However, if the beam diameter of the laser beam is reduced, the laser beam may be diffused at edges of the screen. This phenomenon is apt to cause deterioration of resolution of the laser image projection device.

Figure 2B:
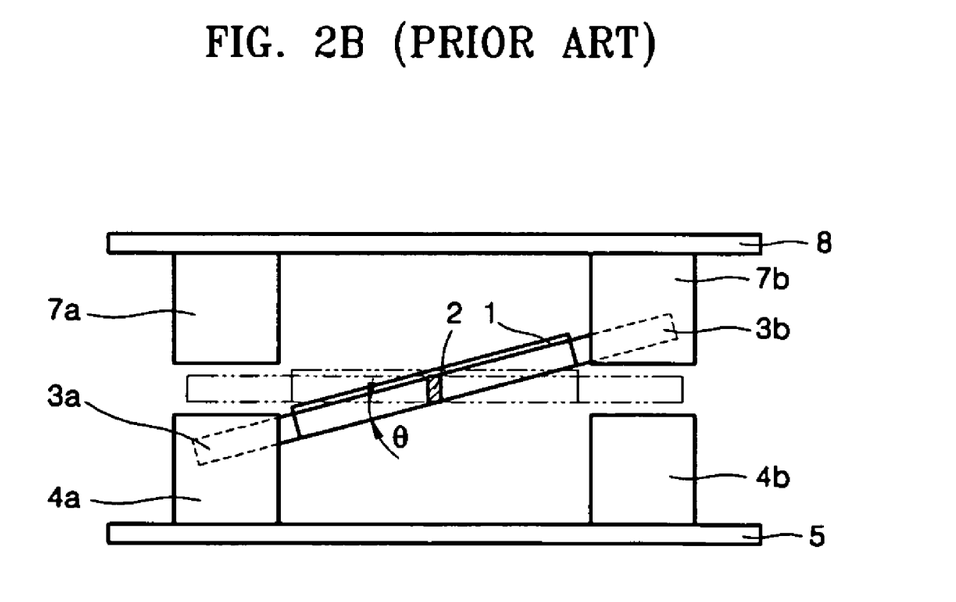
FIG. 2B is a sectional view showing a conventional double comb electrode structure for improving a driving angle.

Thus, in order to enhance resolution of the laser image projection device, it is required to increase the size of the mirror unit 1 so that a laser beam with larger beam diameter may be reflected or to increase a driving angle of the mirror unit 1. Accordingly, as shown in FIG. 2B, upper static comb electrodes 7a and 7b are added in the upper portion of the mirror unit 1 so as to double a driving force, which also doubles the driving angle.

However, if the size of the mirror unit 1 is increased, its weight is also increased to deteriorate a driving speed of the microscanner. In addition, there is also a limit in increasing a driving angle of the mirror unit 1. It is because, if the movable comb electrodes 3 at both sides of the mirror unit 1 are completely put into the static comb electrodes 4, driving force is not generated any more and the mirror unit 1 is thus not rotated any more. In this case, in order to increase a driving angle, it is required to increase the heights of the movable comb electrodes 3 and the static comb electrodes 4 so that an angle at which both kinds of electrodes are completely overlapped becomes larger. Thus, in order to increase a driving angle, the thickness of the mirror unit 1 should be increased, which also causes increase of weight of the mirror unit 1.

SUMMARY

An embodiment of the present disclosure is directed to improving resolution of a microscanner by increasing a driving angle of the microscanner without increasing the thickness of a mirror.

Also, the present disclosure may provide a dual comb electrode structure with spacing for improving a driving angle of a microscanner, and the microscanner adopting the structure.

According to an aspect of the present disclosure, the present disclosure provides a dual comb electrode structure, which may include a mirror unit for reflecting light; a plurality of movable comb electrodes protruded in both sides of the mirror unit; and a plurality of upper and lower static comb electrodes formed above and below the movable comb electrode so as to be alternated with the plurality of movable comb electrodes formed in both sides of the mirror unit, wherein a spacing between the upper static comb electrode and the movable comb electrode is different from a spacing between the lower static comb electrode and the movable comb electrode.

A distance between the lower static comb electrode and the movable comb electrode may be substantially zero, and a distance (H) between the lower static comb electrode and the upper static comb electrode may be defined as H=(1+L/ML)×MT where a thickness of the mirror unit is MT, a distance from a center of the mirror unit to an end thereof is ML, and a distance from the center of the mirror to an end of the movable comb electrode is L.

According to another aspect of the present disclosure, there may be provided a microscanner, which includes a mirror unit for reflecting light; upper and lower substrates spaced apart from each other and disposed in upper and lower portions of the mirror unit respectively; a support formed between the upper and lower substrates to support both sides of the mirror unit so that the mirror unit may be suspended between the upper and lower substrates; a plurality of movable comb electrodes vertically formed at a predetermined interval along both sides of the mirror unit; and a plurality of upper and lower static comb electrodes respectively installed to the upper and lower substrates so as to be alternated with the plurality of movable comb electrodes formed in both sides of the mirror unit, wherein a spacing between the upper static comb electrode and the movable comb electrode is different from a spacing between the lower static comb electrode and the movable comb electrode.

The support may include a lower support formed on the lower substrate to surround the mirror unit, an upper support formed on the upper substrate in correspondence to the lower support, and an adhesive layer for adhering the lower support to the upper support. In addition, the lower support may include a first lower support formed on the lower support to transfer power to the lower static comb electrodes, an insulation layer formed on the first lower support, and a second lower support formed on the insulation layer to transmit power to the mirror unit. At this time, the second lower support may have a protrusion protruded at a part of one side thereof, and an electrode for supplying power is preferably prepared on an upper surface of the protrusion.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION OF EXEMPLARY EMBODIMENTS OF THE DISCLOSURE

Hereinafter, configuration and operation of a dual comb electrode structure with spacing and a microscanner adopting the structure according to an embodiment of the present disclosure will be described in detail.

Figure 3A:
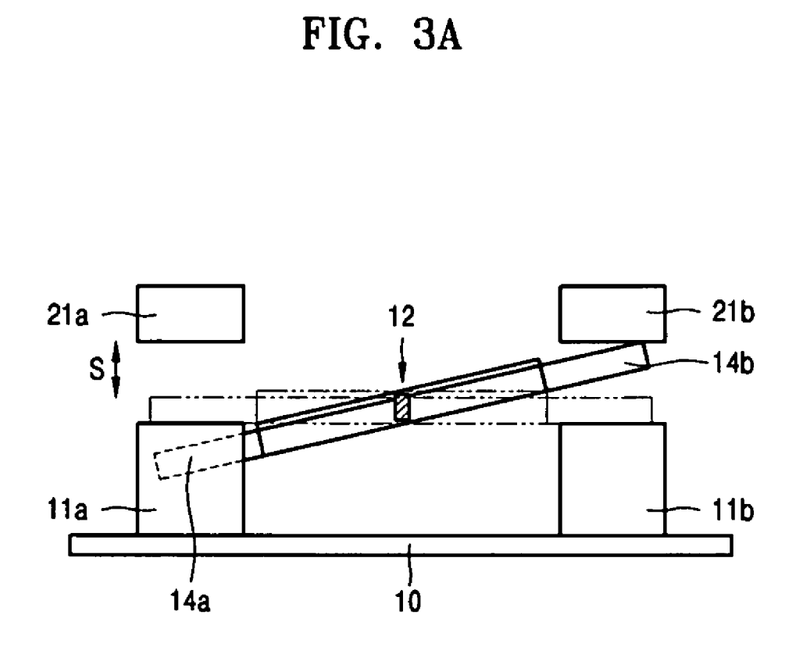
FIGS. 3A through 3C are schematic sectional views for illustrating the dual comb electrode structure with spacing and its operation principle according to the present disclosure.
Figure 3B:
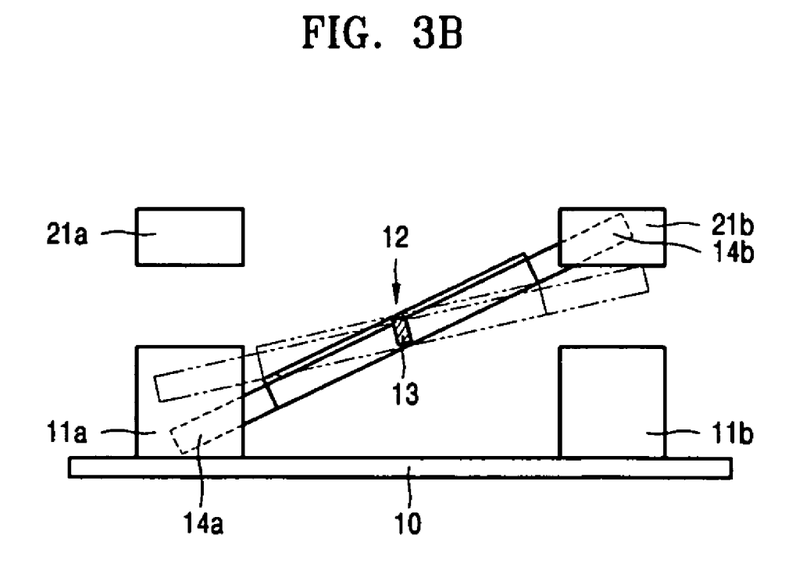
Figure 3C:
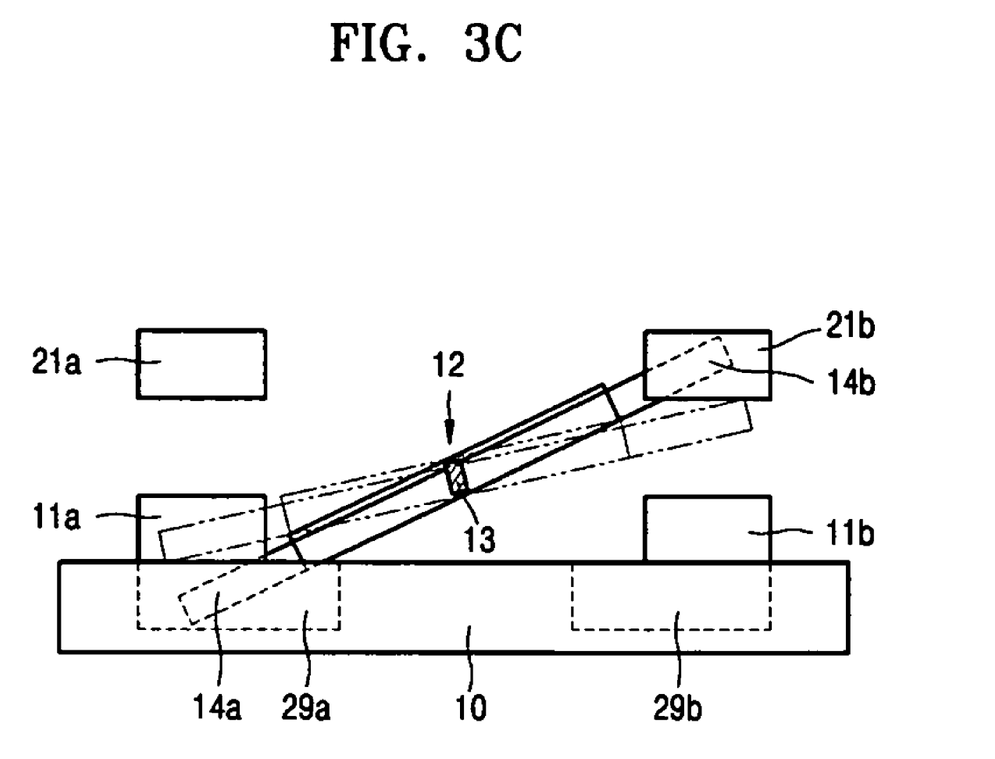

FIGS. 3A through 3C are schematic sectional views for illustrating configuration and operation of the dual comb electrode structure according to the present disclosure. First, as shown in FIGS. 3A and 3B, the dual comb electrode structure of the present disclosure may be configured so that static comb electrodes alternated with movable comb electrodes 14a and 14b at both sides of a mirror unit 12 are prepared in upper and lower portions of the mirror unit 12, respectively. That is to say, upper static comb electrodes 21a and 21b may be disposed above the movable comb electrodes 14a and 14b in addition to lower static comb electrodes 11a and 11b disposed below the movable comb electrodes 14a and 14b that are similar to the conventional ones. At this time, the upper static comb electrodes 21a and 21b may be separated from the movable comb electrodes 14a and 14b as much as a predetermined spacing (s).

In the dual comb electrode structure configured as mentioned above according to the present disclosure, a predetermined voltage may be applied to the movable comb electrodes 14a and 14b at both sides of the mirror unit 12, and positive and negative voltages may be applied to the lower static comb electrodes 11a and 11b, respectively, at the same time. For example, $V_1$ voltage may be applied to the lower static comb electrode 11a at the left side in the figure, $-V_1$ voltage may be applied to the lower static comb electrode 11b at the right side, and V voltage may be applied to both movable comb electrodes 14a and 14b at right and left sides. And then, as shown in FIG. 3A, the mirror unit 12 may be rotated until the movable comb electrode 14a is completely put into and overlapped with the lower static comb electrode 11a by means of voltage difference between them. If the movable comb electrode is completely overlapped with the lower static comb electrode, driving force is not provided by the lower static comb electrode any more. Thus, operation may be identical to the conventional one herein before.

After that, in the state of FIG. 3A, when it is intended to increase a driving angle of the microscanner, opposite voltages may be applied to the upper static comb electrodes 21a and 21b, respectively. At this time, in order to rotate the mirror unit 12 further, voltage with the same polarity may be applied to electrodes that are symmetrical with respect to a support shaft 13 such as a torsion spring. For example, $-V_2$ voltage may be applied to the upper static comb electrode 21a at the left and $V_2$ voltage may be applied to the upper static comb electrode 21b at the right. Here, the polarities are proposed as an example, and not intended to limit the disclosure. In addition, an absolute value $V_2$ of the voltages applied to the upper static comb electrodes 21a and 21b may be equal to or larger than an absolute value $V_1$ of the voltage applied to the lower static comb electrodes 11a and 11b.

Then, as shown in FIG. 3B, the mirror unit 12 may be rotated until the movable comb electrode 14b is completely put into and overlapped with the upper static comb electrode 21b. Thus, if the upper static comb electrodes 21a and 21b are disposed at a suitable interval like the present disclosure, it may be possible to increase a driving angle of the microscanner. In the above description, it is explained that voltage may be applied first to the lower static comb electrodes 11a and 11b and then to the upper static comb electrodes 21a and 21b, but it is also possible that voltage may be applied to the upper static comb electrodes 21a and 21b and the lower static comb electrodes 11a and 11b at the same time.

At this time, in order that the mirror unit 12 is rotated until the movable comb electrode 14b may be completely overlapped with the upper static comb electrode 21b, the movable comb electrode 14a that is already overlapped with the lower static comb electrode 11a may be rotated once more. Accordingly, the height of the lower static comb electrodes 11a and 11b should be twice of the height of the upper static comb electrodes 21a and 21b. This increases complexity in the manufacturing processes. Accordingly, as shown in FIG. 3C, if grooves 29a and 29b are formed on the substrate 10 as much as the height with which the movable comb electrodes 14a and 14b makes one additional rotation, the lower static comb electrodes 11a and 11b may have the same height as the upper static comb electrodes 21a and 21b, not to be made higher. That is to say, a plurality of grooves 29a and 29b may be formed on the substrate 10 at positions opposite to the movable comb electrodes 14a and 14b so that the movable comb electrodes 14a and 14b may be put into the grooves 29a and 29b.

Figure 4:
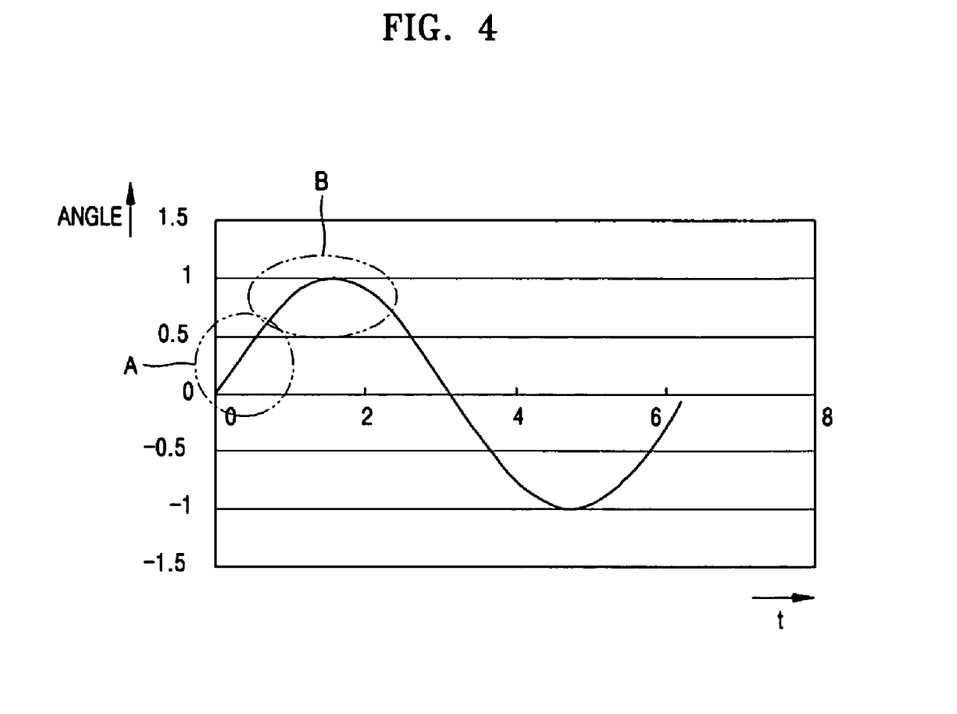
FIG. 4 is a graph exemplifying a rotating angle of a mirror unit according to time in the dual comb electrode structure with spacing according to the present disclosure.

FIG. 4 is a graph exemplifying showing a rotating angle of the mirror unit in the dual comb electrode structure with spacing according to the present disclosure. As shown in FIG. 4, the mirror unit 12 in the dual comb electrode structure with spacing according to the present disclosure conducts periodic movement at a constant driving angle according to the voltage applied. At this time, as mentioned above, the mirror 12 of the present disclosure may be driven by the lower static comb electrodes 11a and 11b at a low driving angle designated by the circle A, and by the upper static comb electrodes 21a and 21b at a high driving angle designated by the circle B.

Figure 5:
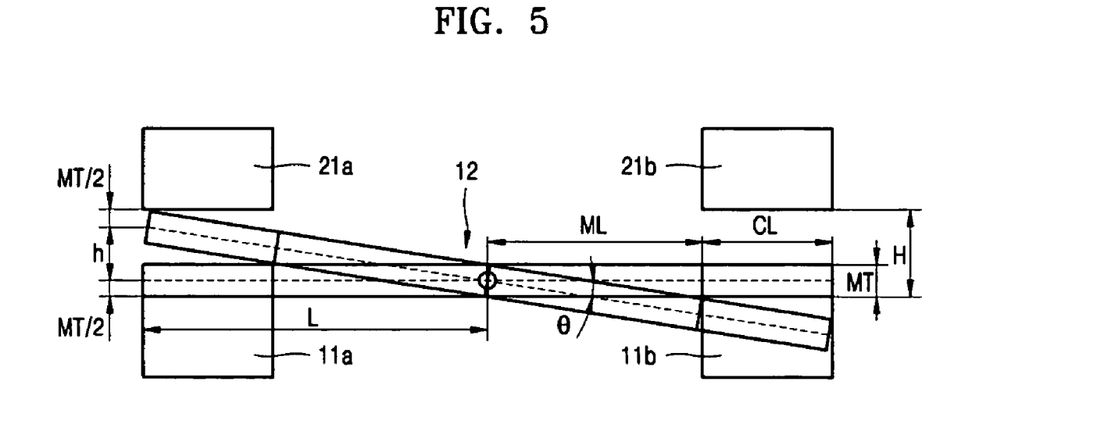
FIG. 5 is a sectional view for illustrating a spacing between upper and lower static comb electrodes in the dual comb electrode structure with spacing according to the present disclosure.

Now, spacings between the upper static comb electrodes 21a and 21b and the movable comb electrodes 14a and 14b and between the lower static comb electrodes 11a and 11b and the movable comb electrodes 14a and 14b may be described referring to FIG. 5 that shows a figure for illustrating the spacing between the upper and lower static comb electrodes.

In order that the dual comb electrode structure with spacing according to the present disclosure may be naturally operated, after the mirror unit 12 is rotated to a certain angle by means of the lower static comb electrodes 11a and 11b, the mirror unit 12 may be rotated at a higher angle continuously without cessation of motions by means of the upper static comb electrodes 21a and 21b. For this purpose, for example, in FIG. 5, at the instant that the right movable comb electrode 14b is completely overlapped with the lower static comb electrode 11b, the spacing between an end portion of the left movable comb electrode 14a and the upper static comb electrode 21a should be substantially near to zero. As shown in FIG. 5, it is defined that a thickness of the mirror unit 12 is MT, a distance from a center of the mirror unit 12 to an end of the mirror unit 12 is ML, a width of the movable comb electrodes 14a and 14b is CL, a distance from the center of the mirror unit 12 to an end of the movable comb electrodes 14a and 14b is L(=ML+CL), a distance for the movable comb electrodes 14a and 14b to move until the movable comb electrodes 14a and 14b may be completely overlapped with the lower static comb electrodes 11a and 11b is h, a distance between the lower static comb electrodes 11a and 11b and the upper static comb electrodes 21a, 21b is H, and an angle at which the movable comb electrodes 14a and 14b may be completely overlapped with the lower static comb electrodes 11a and 11b is θ. Here, the thickness of the mirror unit 12 is so small to be negligible in comparison to the size of the mirror unit 12 (MT<<ML), and θ is very small and it is assumed that sin θ is approximately equal to θ. In addition, the spacing between the lower static comb electrodes 11a and 11b and the movable comb electrodes 14a and 14b is very small, commonly about 1 μm, so it is assumed to be substantially zero for convenience here.

Then, sin θ may be expressed by MT/ML or h/L approximately, as follows.

(A) Equation 1

$$\sin\theta \cong MT/ML$$

$$\sin\theta \cong h/L$$

$$h \cong L \times \sin\theta L \times (MT/ML)$$

Here, H may be expressed by the following equation.

(B) Equation 2

$$H \cong h + MT \cong L \times (MT/ML) + MT \cong (1 + L/ML) \times MT$$

Thus, the microscanner according to the present disclosure may be most naturally operated under the condition that H=(1+L/ML)×MT.

Figure 6:
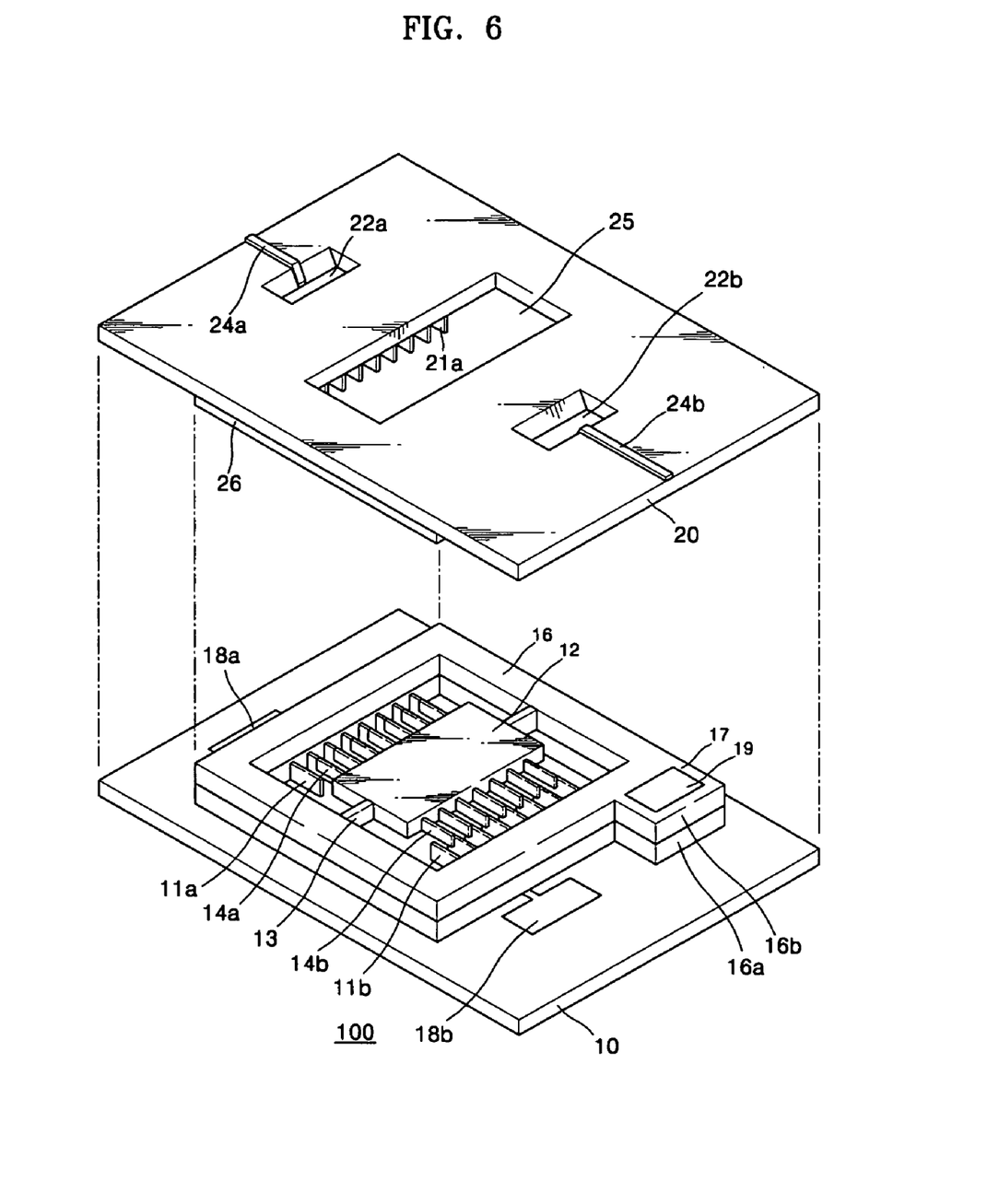
FIG. 6 is a perspective exploded view exemplifying a microscanner adopting the dual comb electrode structure with spacing according to the present disclosure.
Figure 7:
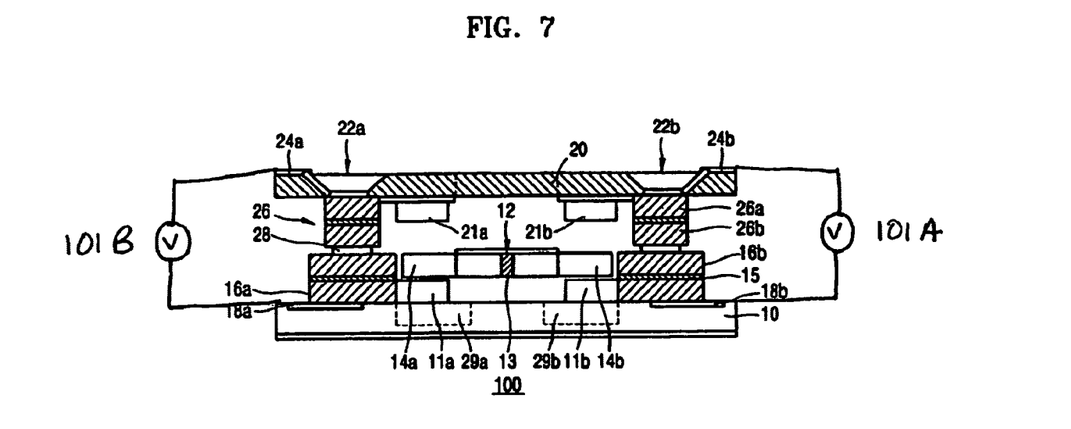
FIG. 7 is a sectional view exemplifying a microscanner adopting the dual comb electrode structure with spacing according to the present disclosure.

FIG. 6 is a perspective exploded view exemplarily showing a microscanner 100 adopting the dual comb electrode structure with spacing according to the present disclosure, and FIG. 7 is a section view exemplarily showing the microscanner 100 adopting the dual comb electrode structure with spacing according to the present disclosure. As shown in FIGS. 6 and 7, the microscanner 100 of the present disclosure may include a mirror unit 12 for reflecting light, upper and lower substrates 20 and 10 spaced apart from each other and disposed in upper and lower portions of the mirror unit 12, respectively, supports 26 and 16 formed between the upper and lower substrates 20 and 10 to support both sides of the mirror unit 12 so that the mirror unit 12 is suspended between the upper and lower substrates 20 and 10, a plurality of movable comb electrodes 14a and 14b vertically formed at a predetermined interval along both sides of the mirror unit 12, and a plurality of upper and lower static comb electrodes 21a and 21b, 11a and 11b, respectively, installed to the upper and lower substrates so as to be alternated with the plurality of movable comb electrodes 14a and 14b formed in both sides of the mirror unit. Here, as described above, a spacing between the upper static comb electrode and the movable comb electrode may be substantially zero, and the distance H between the lower static comb electrodes 11a and 11b and the upper static comb electrodes 21a and 21b may be set as follows: H=(1+L/ML)×MT.

Here, as shown in FIG. 6, the supports 26 and 16 may include a lower support 16 formed on the lower substrate 10 to surround the mirror unit 12 and an upper substrate 26 formed on the lower substrate 10 in correspondence to the lower support 16. In addition, as shown in FIG. 7, an adhesive layer 28 may be interposed between the lower support 16 and the upper support 26 so as to combine the upper substrate 20 to the lower substrate 10. Though it is shown in FIG. 6 that the upper and lower supports 26 and 16 surround the mirror unit 12 entirely, it may be modified in another way. That is to say, the supports 26 and 16 may have any shape if they may support the mirror unit 12 between the upper and lower substrates 20 and 10 and combine the upper and lower substrates 20 and 10.

In addition, the lower support 16 may include a first lower support 16a formed on the lower substrate 10, and a second lower support 16b formed on the first lower support 16a. The first lower support 16a may transfer power applied from pads 18a and 18b prepared in the lower substrate 10 toward the lower static comb electrodes 11a and 11b, respectively.

Between the second lower support 16b and both ends of the mirror unit 12, a support shaft 13 may be connected so that the mirror unit 12 may be rotatably supported with respect to the second lower support 16b. That is to say, the mirror unit 12 may be suspended between the upper and lower substrates 20 and 10 by means of the support shaft 13, and the mirror unit 12 rotates about the center of the support shaft 13. Generally, the support shaft 13 may be a torsion spring formed between both ends of the mirror unit 12 and the second lower support 16b, respectively. In addition, the second lower support 16b has a protrusion 17 partially protruded from one side thereof as shown in FIG. 6. On an upper surface of the protrusion 17, an electrode pad 19 may be prepared to apply electric signals to the mirror unit 12. The voltage applied to the electrode pad 19 may be transferred to the movable comb electrodes 14a and 14b through the second lower support 16b and the support shaft 13. At this time, in order to prevent electric short circuit between the first lower support 16a and the second lower support 16b, an insulation layer 15 may be interposed between the first and second lower supports 16a and 16b.

Meanwhile, on the upper surface of the upper substrate 20, an opening 25 may be formed at a position corresponding to the mirror unit 12 so that the mirror unit 12 is exposed outward. However, in case that the upper substrate 20 is made of glass, the opening 25 may not be formed. In this case, a coating with high reflectivity may be formed on the upper substrate 20 made of glass so that at least 99% of beams may penetrate the upper substrate 20. In addition, at right and left positions of the opening 25 of the upper substrate 20, electrode pads 24a and 24b may be formed along through holes 22a and 22b from the upper surface of the upper substrate 20.

The electrode pads 24a and 24b may be connected to the upper support 26 formed on the lower surface of the upper substrate 20. Thus, the voltage applied to the electrode pads 24a and 24b may be respectively transferred to the upper static comb electrodes 21a and 21b through the upper support 26. Here, the upper support 26 may include a first upper support 26a formed on the upper substrate 20, and a second upper support 26b formed on the first upper support 26a. The first upper support 26a may transfer power applied through the pads 24a and 24b prepared on the upper substrate 20 toward the upper static comb electrodes 21a and 21b. In addition, the second upper support 26b may determine a spacing between the movable comb electrodes 14a and 14b and the upper static comb electrodes 21a and 21b.

In addition, as shown in FIG. 7, a plurality of grooves 29a and 29b may be formed on the lower substrate 10 at positions opposite to the plurality of movable comb electrodes 14a and 14b. Then, in case that the movable comb electrodes 14a and 14b may be driven at a large angle by means of the upper static comb electrodes 21a and 21b, the movable comb electrodes 14a and 14b may be put into the grooves 29a and 29b. According to this configuration, the lower static comb electrodes 11a and 11b may be configured with the same height as the upper static comb electrodes 21a and 21b, not configured higher.

According to the present disclosure, it is possible to increase a driving angle of the microscanner without increasing a thickness of the mirror. Thus, a larger driving angle may be obtained without deteriorating a driving speed of the microscanner. As a result, the resolution of the microscanner may be remarkably enhanced.

In addition, since the above-described embodiment of the present disclosure allows just a change to the structure of a conventional static comb electrode into a dual electrode structure with spacing, structure and design of an existing microscanner may be used as they were, namely without change. In addition, an existing manufacturing procedure may also be used without change to make a microscanner according to the present disclosure. Furthermore, the microscanner of the present disclosure has very simple configuration, thereby allowing very easy wiring work.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A dual comb electrode structure, comprising:
a mirror unit capable of reflecting light;
a plurality of movable comb electrodes protruding from either side of the mirror unit;
a plurality of upper and lower static comb electrodes, wherein the plurality of upper static comb electrodes are above the plurality of movable comb electrode when no voltage is applied to the plurality of upper static comb electrodes, the plurality of lower static comb electrodes, or the plurality of movable comb electrodes, and, wherein the plurality of lower static comb electrodes are below the plurality of movable comb electrode when no voltage is applied to the plurality of upper static comb electrodes, the plurality of lower static comb electrodes, or the plurality of movable comb electrodes,
wherein a spacing between the upper static comb electrodes and the plurality of movable comb electrodes is different from a spacing between the lower static comb electrodes and the movable comb electrodes when no voltage is applied to the plurality of upper static comb electrodes, the plurality of lower static comb electrodes.

2. The dual comb electrode structure of claim 1, wherein a distance between the plurality of lower static comb electrodes and the plurality of movable comb electrode is substantially zero, and a distance (H) between the plurality of lower static comb electrodes and the plurality of upper static comb electrodes is defined as $H=(1+L/ML) \times MT$ where a thickness of the mirror unit is MT, a distance from a center of the mirror unit to an end thereof is ML, and a distance from the center of the mirror to an ends of the plurality of movable comb electrodes is L.

3. The dual comb electrode structure of claim 2, further comprising a voltage driver connected to the plurality of upper and lower static comb electrodes wherein an absolute value of a voltage applied to the upper static comb electrode at the left side of the mirror unit is equal to or larger than an absolute value of a voltage applied to the lower static comb electrode at the right side of the mirror unit, and an absolute value of a voltage applied to the upper static comb electrode at the right side of the mirror unit is equal to or larger than an absolute value of a voltage applied to the lower static comb electrode at the left side of the mirror unit.

4. The dual comb electrode structure of claim 3, wherein a voltage of a first polarity is applied to the upper static comb electrode at the left side of the mirror unit and the lower static comb electrode at the right side of the mirror unit, while a voltage of a second polarity opposite to the first polarity is applied to the upper static comb electrode at the right side of the mirror unit and the lower static comb electrode at the left side of the mirror unit.

5. The dual comb electrode structure of claim 2, wherein a voltage is applied to the plurality of upper static comb electrodes when the movable comb electrodes are fully interdigitated with the lower static comb electrodes due to rotation of the mirror unit.

6. The dual comb electrode structure of claim 2, wherein the plurality of movable comb electrodes comprise individual electrodes projecting from opposite sides of the mirror unit at a predetermined interval.

7. A microscanner, comprising:
a mirror unit capable of reflecting light;
upper and lower substrates spaced apart from each other and disposed above and below the mirror unit, respectively;
a support formed between the upper and lower substrates to support opposite sides of the mirror unit so that the mirror unit is suspended between the upper and lower substrates;
a plurality of movable comb electrodes projecting from opposite sides of the mirror unit; and
a plurality of upper and lower static comb electrodes, wherein the plurality of upper static comb electrodes are above the plurality of movable comb electrode when no voltage is applied to the plurality of upper static comb electrodes, the plurality of lower static comb electrodes, or the plurality of movable comb electrodes, and, wherein the plurality of lower static comb electrodes are below the plurality of movable comb electrode when no voltage is applied to the plurality of upper static comb electrodes, the plurality of lower static comb electrodes, or the plurality of movable comb electrodes,
wherein a spacing between the plurality of upper static comb electrodes and the plurality of movable comb electrodes is different from a spacing between the plurality of lower static comb electrodes and the plurality of movable comb electrodes.

8. The microscanner of claim 7, wherein a plurality of grooves are formed in the lower substrate at positions opposite to the plurality of movable comb electrodes, and a portion of the movable comb electrodes located in the grooves when the plurality of movable comb electrodes are driven by the plurality of upper static comb electrodes.

9. The microscanner of claim 7, wherein a distance between the plurality of lower static comb electrodes and the plurality of movable comb electrodes is substantially zero, and a distance (H) between the plurality of lower static comb electrodes and the plurality of upper static comb electrodes is defined as $H=(1+L/ML) \times MT$ where a thickness of the mirror unit is MT, a distance from a center of the mirror unit to an end thereof is ML, and a distance from the center of the mirror to ends of the movable comb electrodes is L.

10. The microscanner of claim 9, further comprising a voltage driver connected to the plurality of upper and lower static comb electrodes, wherein an absolute value of a voltage applied to the upper static comb electrode at the left side of the mirror unit is equal to or larger than an absolute value of a voltage applied to the lower static comb electrode at the right side of the mirror unit, and an absolute value of a voltage applied to the upper static comb electrode at the right side of the mirror unit is equal to or larger than an absolute value of a voltage applied to the lower static comb electrode at the left side of the mirror unit.

11. The microscanner of claim 10, wherein a voltage of a first polarity is applied to the upper static comb electrode at the left side of the mirror unit and the lower static comb electrode at the right side of the mirror unit, while a voltage of a second polarity opposite to the first polarity is applied to the upper static comb electrode at the right side of the mirror unit and the lower static comb electrode at the left side of the mirror unit.

12. The microscanner of claim 9, further comprising a voltage driver connected to the plurality of upper and lower static comb electrodes, wherein a voltage is applied to the plurality of upper static comb electrodes in the event that movable comb electrodes are fully interdigitated with lower static comb electrodes due to rotation of the mirror unit.

13. The microscanner of claim 9, wherein the support includes a lower support formed on the lower substrate to surround the mirror unit, an upper support formed on the upper substrate in correspondence to the lower support, and an adhesive layer for adhering the lower support to the upper support.

14. The microscanner of claim 13, wherein the lower support includes a first lower support formed on the lower support to transfer power to the lower static comb electrodes, an insulation layer formed on the first lower support, and a second lower support formed on the insulation layer to transmit power to the mirror unit.

15. The microscanner of claim 14, wherein the second lower support has a protrusion protruding from a part of one side thereof, and an electrode for supplying power on an upper surface of the protrusion.

16. The microscanner of claim 14, wherein the mirror unit further includes a support shaft connected between both ends of the mirror unit and the second lower support so that the mirror unit is rotatably supported by the second lower support.

17. The microscanner of claim 16, wherein the support shaft is a torsion spring portions of which are respectively located between opposite ends of the mirror unit and locations on the second lower support.

18. The microscanner of claim 13, wherein the upper support includes a first upper support formed on the upper substrate to transfer power to the plurality of upper static comb electrodes, and a second upper support formed on the first upper support to set a spacing between the plurality of movable comb electrodes and the plurality of upper static comb electrodes.

19. The microscanner of claim 9, wherein an opening is formed in a surface of the upper substrate at a position corresponding to the mirror unit so that the mirror unit is exposed.

20. The microscanner of claim 9, wherein the upper substrate is made of glass and has a high reflectivity coating located on a surface of the upper substrate.

* * * * *